(No Model.) 3 Sheets—Sheet 1.

J. F. STEWARD.
MOWER.

No. 554,010. Patented Feb. 4, 1896.

Witnesses
Arthur Johnson
George H. Ellis

Inventor.
John F. Steward (No Model.) 3 Sheets—Sheet 2.

J. F. STEWARD.
MOWER.

No. 554,010. Patented Feb. 4, 1896.

Witnesses
Arthur Johnson
George H. Ellis

Inventor
John F. Steward

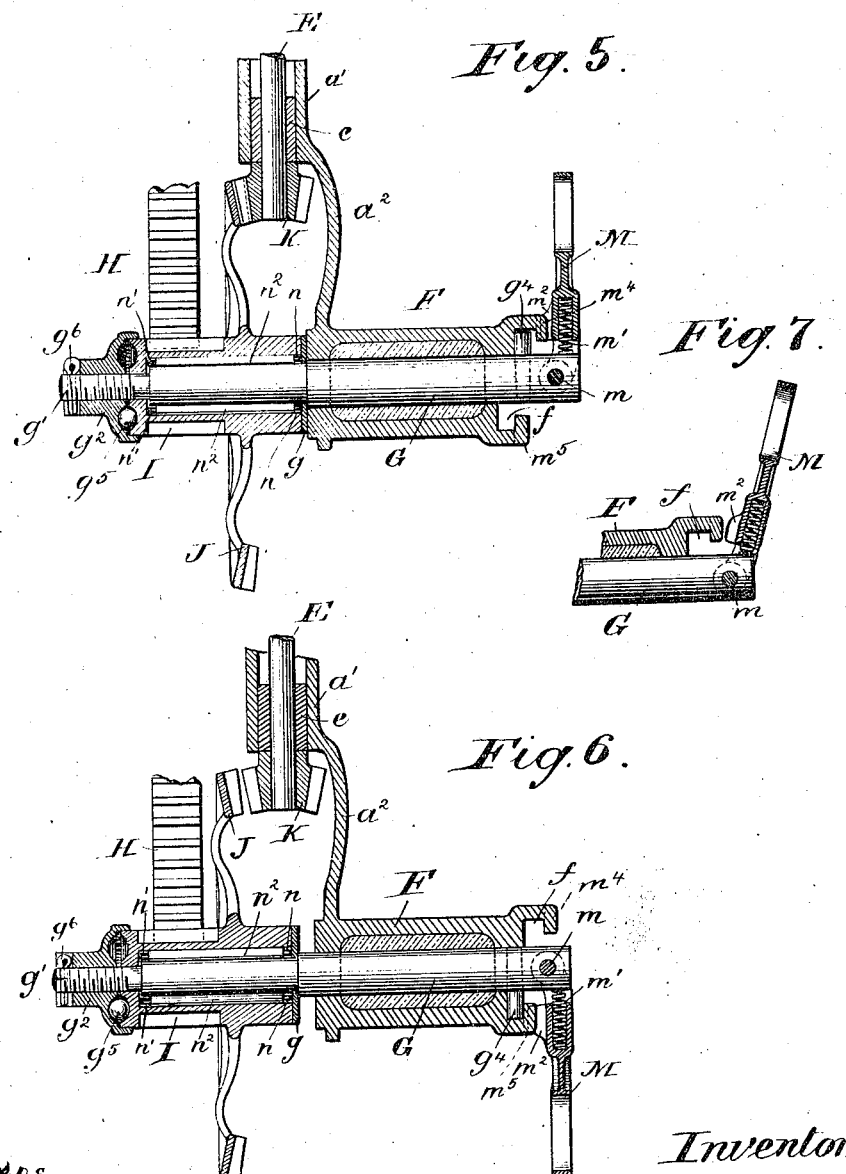

UNITED STATES PATENT OFFICE.

JOHN F. STEWARD, OF CHICAGO, ILLINOIS.

MOWER.

SPECIFICATION forming part of Letters Patent No. 554,010, dated February 4, 1896.

Application filed May 8, 1893. Serial No. 473,469. (No model.)

*To all whom it may concern:*

Be it known that I, JOHN F. STEWARD, of Chicago, in the county of Cook and State of Illinois, have invented certain new and useful Improvements in Mowing-Machines, of which the following is a full description, reference being had to the accompanying drawings, in which—

Figure 1:
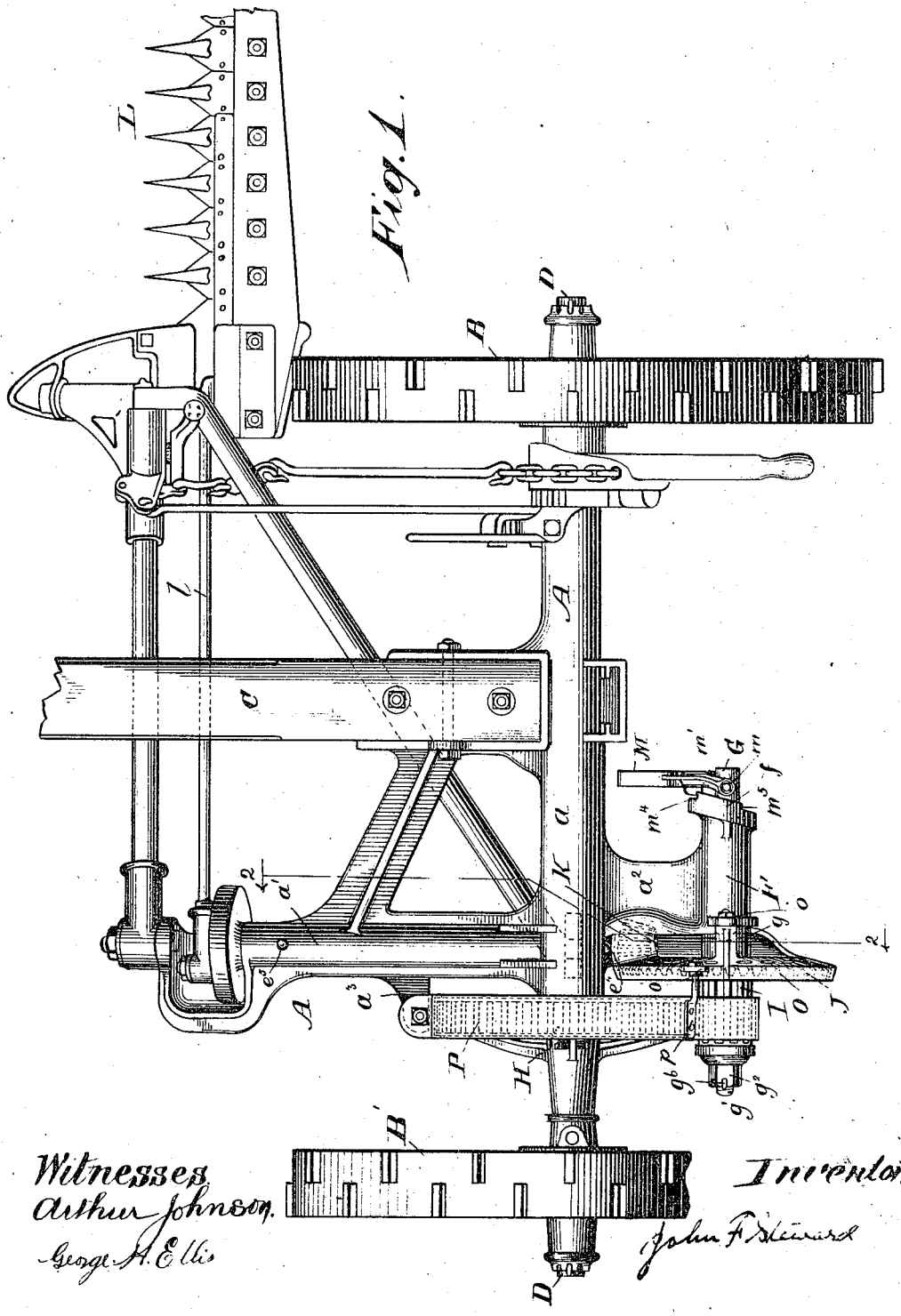
Figure 2:
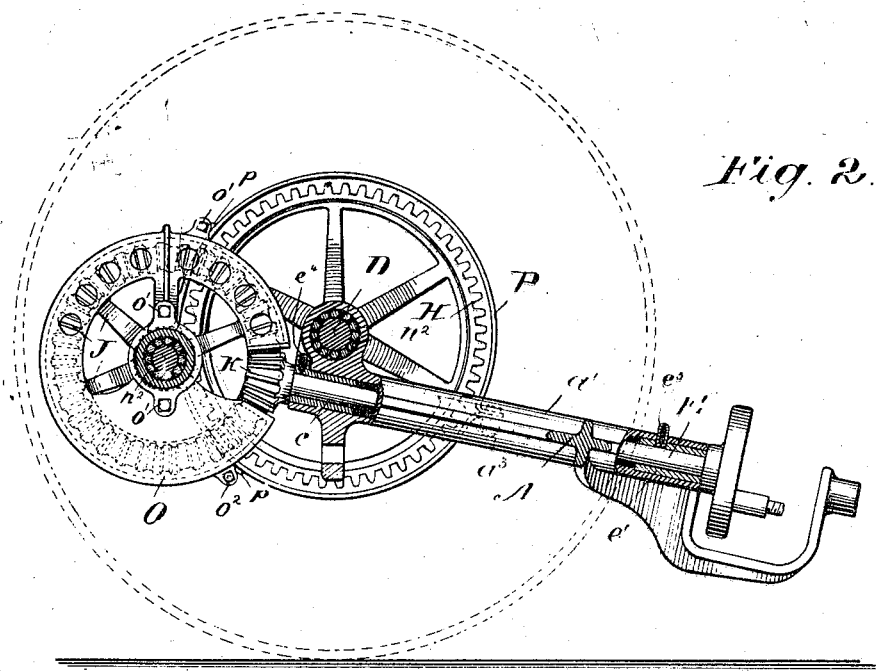
Figure 3:
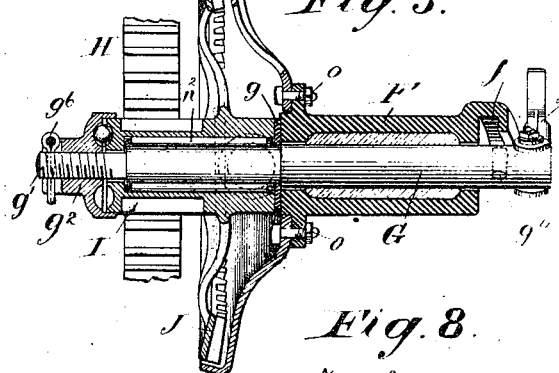
Figure 4:
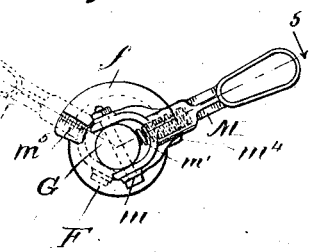
Figure 8:
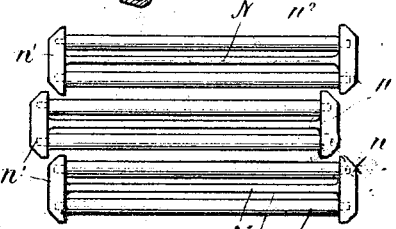

Figure 1 is a plan view of the mowing-machine complete aside from a portion of the tongue and cutting apparatus. Fig. 2 is a sectional side elevation of certain parts of the frame and gearing as if cut on the line 2 2 of Fig. 1. Figs. 3, 4, 5, 6, and 7 are sectional views showing the mechanism for throwing the cutting apparatus into and out of operation and the ball and roller bearings for the gearing. Fig. 8 shows the construction of the roller-bearings.

A is the main frame or gearing-carriage of the mowing-machine, and B and B' supporting-wheels for the same. To this gearing-carriage is suitably socketed the draft-tongue C. Reaching from and connecting wheel to wheel is the axle D passing through the transverse sleeve-like portion $a$ of the frame A. As one part with the sleeve $a$ is the sleeve $a'$. Through this passes the crank-shaft E, having at its forward end the usual balance-wheel and crank-wrist. This sleeve is placed in a lower position than that of $a$, so that the crank-shaft can pass beneath the axle. The said shaft is journaled in bushings $e$ and $e'$. Reaching rearward from the main transverse portion of the frame is the strong arm $a^2$. This terminates at its rear in a transverse sleeve F, in which is placed a short shaft G, that is both free to rotate and to move endwise. Upon the axle adjacent to the wheel B' is the spur-gear H, and upon the shaft G is the pinion I and the bevel-gear J, the said pinion and gear being preferably made as one piece. Upon the rear end of the crank-shaft is secured the pinion K. From the wrist of the crank-wheel to the cutting apparatus L passes the pitman $l$. The forward advance of the machine over the ground imparts, through the gearing, motion to the cutting apparatus in the usual manner. The said cutting apparatus is secured to the main frame by a suitable coupling-frame and is raised and lowered by the usual levers. For throwing the cutting apparatus into and out of gear I employ the following means, of which reference to Figs. 5 and 6 will show the details of construction: Upon the shaft G is the collar $g$, shown as resting against a shoulder upon the said shaft, simply because of ease of construction, but the collar may be considered as one piece with the shaft.

The left-hand end of the shaft G is reduced and threaded at $g'$. Between the collar $g$ and the nut $g^2$, that is screwed onto the threaded end of the shaft, is the pinion I and the hub of the bevel-gear J. Because of the freedom of the shaft G to be moved endwise and carry with it the bevel-gearing a movement of the said shaft to the right, when considering Fig. 1, carries the bevel-gear J into mesh with the pinion K. Movement of the said shaft to the left carries the gear out of mesh with the pinion. By the simple movement of the shaft the shifts into and out of gear may be accomplished. In order that the shaft may fit snugly in the frame I prefer to core out the latter and pour molten Babbitt metal around it. To aid in throwing the shaft G longitudinally I provide a cam $f$, preferably in the form of a groove, within the enlarged right end of the sleeve F and into the shaft G thrust the pin $g^4$. This cam-groove is part of a spiral, as shown in Fig. 1. M is the shifting-lever, pivoted at $m$ to the shaft G and having within a recess the spring $m'$ and upon the side adjacent to the cam $f$ the catch $m^2$. The spring $m'$ is placed so that its lower end shall rest upon the shaft G at a point to the right of the axis of the lever, the result of which is the tendency to hold the lever always to the left and the catch $m^2$ into engagement with the stops $m^4$ and $m^5$ on the sleeve F.

In Figs. 5 and 6, which show the parts as if cut on a horizontal plane, the catch is shown engaging the stop $m^4$ when in its in-gear position and in Fig. 6 the catch $m^5$ in its out-of-gear position. I have made the shaft G so strong that the bevel-gearing and pinion may "overhang"—that is to say, be suspended on a shaft having a supported end. This enables me to dispense with all frame-work that has usually been necessary for supporting the end of shafts the equivalent of G between the gear H and the supporting-wheel B'.

In order to reduce the friction of the various shafts I provide roller-bearings, boring out the sleeve $a$ of the main frame at its two ends and placing therein antifriction-rollers, preferably of the construction shown in Fig. 8, said bearings consisting in ranging a series of trucks around the shaft and within the sleeve of the frame. The hub of the spur-pinion and bevel-gear is enlarged to permit of the placement of a series of these trucks around that part of the shaft G upon which the said pinion and bevel-gear revolve. There is, of course, a tendency to move the bevel-gear out of mesh with the pinion it drives. To prevent this in a way that shall be as little productive of friction as possible I provide the circumferentially-grooved nut $g^2$, and in the end of the hub of the pinion provide a corresponding groove opposing the same, and between the two place a single ball $g^5$.

The reduced end of the shaft G is threaded and the nut screwed thereon to any distance necessary to hold the bevel-gear in proper mesh with the pinion. A pin $g^6$ is inserted through holes in the shaft and through slots in the nut that prevents the latter from turning off. The trucks for the roller-bearings I prefer to construct, as shown in Fig. 8, of a bar N, having T-heads $n$ and $n'$, and the rollers $n^2$ placed between. The T-heads project a little distance beyond the rollers, so that when ranged around the shaft the said heads abut against each other and prevent the rollers from coming in contact. In order that the trucks may easily be slid in place without the T-heads so catching as to prevent them from sliding to the home position, I bevel the corners $n^3$, as shown in Fig. 8.

In order to prevent grass from entangling with the bevel-gear I provide a shield O, secured to lugs by bolts $o$, on the arm F, and partly inclosing the bevel-gear and having the lugs $o'$ and $o^2$.

P is a shield for the pinion and spur-gear secured by means of bolts $p$, riveted thereto, and passing through the lugs $o$ and $o'$ upon the shield O and secured to the main frame by a bolt passing through the lug $a^3$.

I place the bushing $e$ into the sleeve $a'$ loosely enough to be easily inserted, and to prevent it from rotating apply the boss $e^4$, that is recessed into the sleeve, and make the said boss serve as an oil-cup. The sleeve $e'$ is preferably tightly fitted and is held from rotating by the oil-cup $e^5$, which is screwed through the shell of the sleeve and into the said bushing.

What I claim as my invention, and desire to secure by Letters Patent, is—

1. In a mowing-machine, and in combination with the main frame, the driving-gear, the pinion K, a support F, a shaft G, a bevel-gear and pinion as I, J, supported upon the said shaft, a spring-held pivoted shipping-lever, secured to said shaft in such a manner as to turn it in its bearing, a cam formed around the said shaft G and having the stops $m^4$ and $m^5$ arranged substantially as described and a catch upon the said lever adapted to engage stops so as to hold the lever in its extreme positions of movement, all arranged and combined whereby the rocking movement of the said shaft, by means of the said spring-held pivoted lever, moves it in a longitudinal direction and thus forces the bevel-gear into and out of engagement with the pinion and holds them in either of said positions, substantially as described.

2. In combination with a shaft and the hubs of gears or of a frame as may be required, said hub or said frame mounted thereon, a series of trucks formed of rollers and having the beveled T ends, substantially as described

JOHN F. STEWARD.

Witnesses:
E. A. ELDRED,
JOHN ROCHE.